United States Patent [19]
Raab et al.

[11] 3,942,555
[45] Mar. 9, 1976

[54] ELECTRICAL SWITCH AND FLUID CONTROL DEVICE

[75] Inventors: Andrew F. Raab, Morton Grove; Jesse M. Cobb, Glenview, both of Ill.

[73] Assignee: Indak Manufacturing Corporation, Northbrook, Ill.

[22] Filed: Mar. 25, 1974

[21] Appl. No.: 454,320

[52] U.S. Cl. .......................... 137/625.2; 200/61.86
[51] Int. Cl.² ......................................... F16K 11/06
[58] Field of Search .......... 74/110, 567, 569; 251/3, 251/251; 137/625.2, 625.25, 636.1, 636; 200/61.86

[56] References Cited
UNITED STATES PATENTS

| | | | |
|---|---|---|---|
| 1,100,136 | 6/1914 | Krause | 251/251 |
| 2,363,235 | 11/1944 | Ellinwood | 137/636.1 X |
| 2,923,518 | 2/1960 | Goodrich | 251/3 |
| 2,960,111 | 11/1960 | Rose | 137/596.13 |
| 3,148,594 | 9/1964 | McCoy | 251/3 X |
| 3,174,403 | 3/1965 | McCoy | 251/3 X |
| 3,242,951 | 3/1966 | Curie et al. | 251/251 X |
| 3,595,271 | 7/1971 | Nelson | 137/596.2 |
| 3,702,098 | 11/1972 | Eburn | 74/110 X |

*Primary Examiner*—Henry T. Klinksiek
*Attorney, Agent, or Firm*—Burmeister, Palmatier & Hamby

[57] ABSTRACT

A combined electrical switch and fluid control device is disclosed, for simultaneously performing electrical and fluid power control functions. For example, the device may be employed on an automotive vehicle for controlling the operation of electrical components and vacuum operated devices. The control device is particularly well adapted for controlling the operation of a heating and air-conditioning system for an automobile or some other automotive vehicle. The control device may comprise a casing, a control member movable in the casing along a predetermined path, electrical switching means in the casing and operable by the movement of the control member along such path, fluid control means in the casing and including a valve member movable in the casing in a direction transverse to the path of the control member, and camming means operable between the control member and the valve member for moving the valve member transversely to such path in response to movement of the control member along the path. The valve member may have passages therein for selectively interconnecting a plurality of valve ports, formed in the casing. The electrical switching means may include fixed contact means, and movable contact means operable by the control member and selectively engageable with such fixed contact means. The camming means may comprise a cam track on the control member, and a cam follower on the valve member and engageable with the cam track. With this camming arrangement, a highly complex coordination can be achieved between the operation of the electrical switching means and the operation of the fluid control valve means. Two or more valve members can be independently controlled, if desired.

12 Claims, 24 Drawing Figures

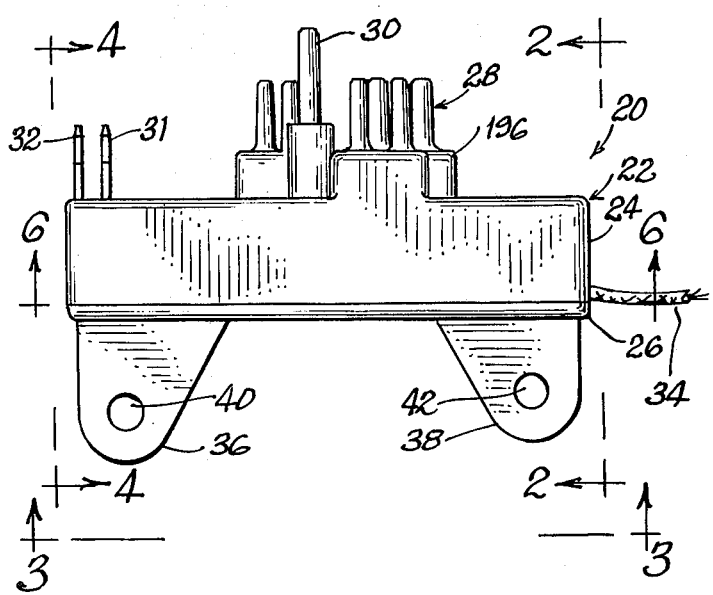
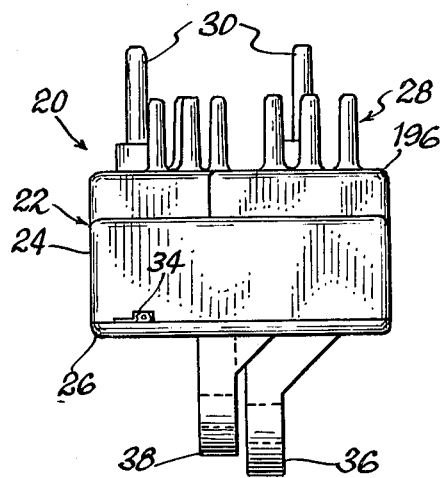
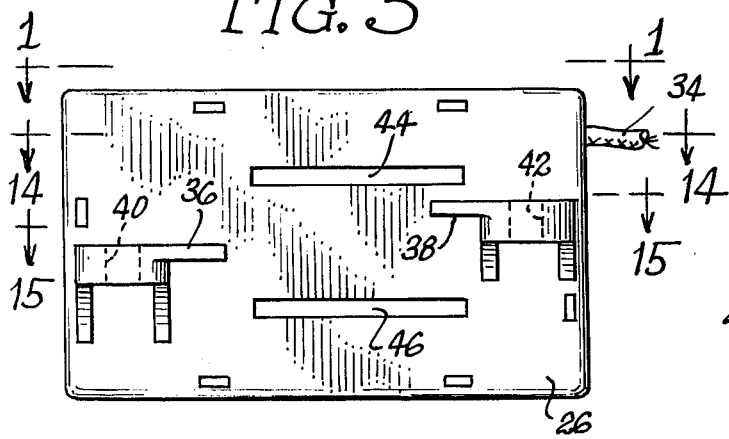
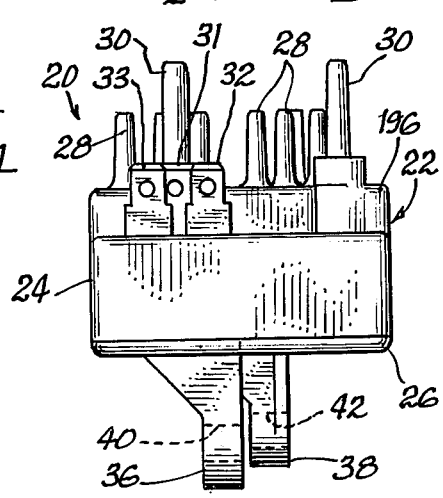
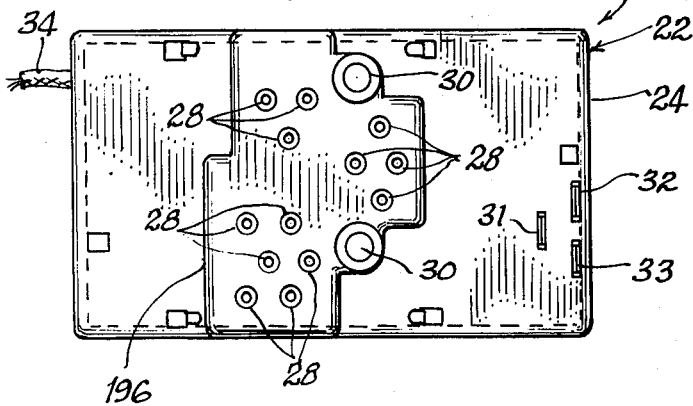

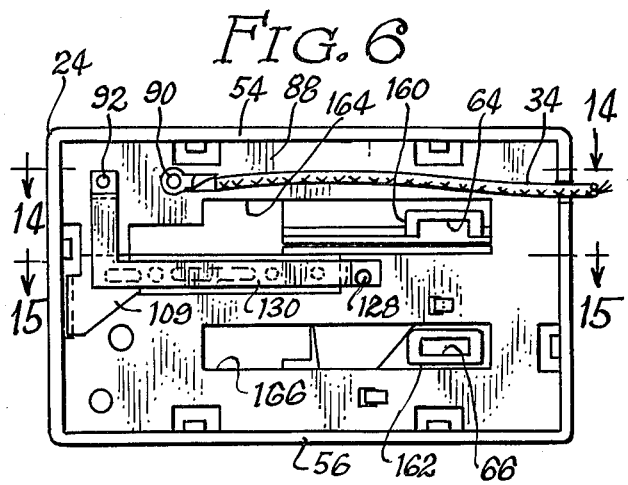
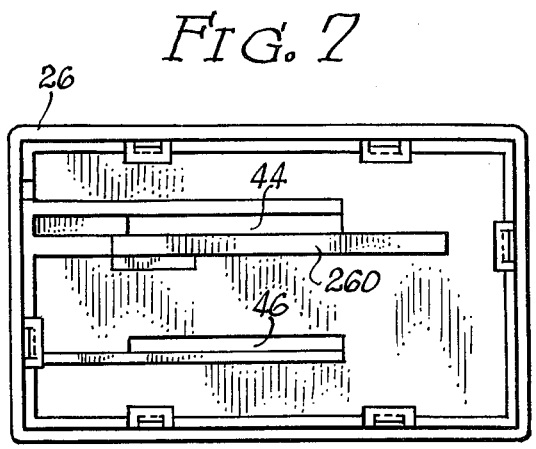
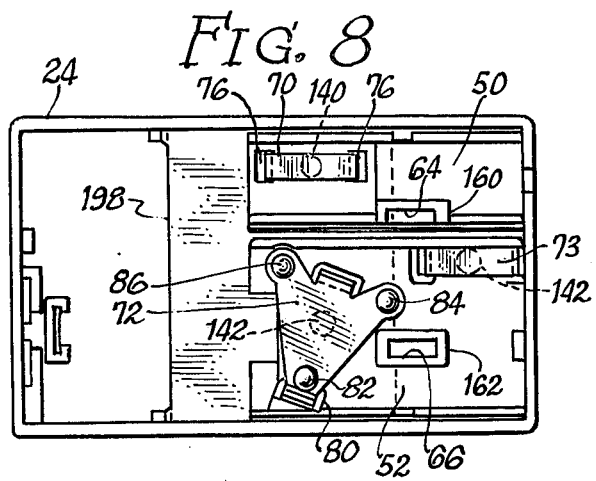
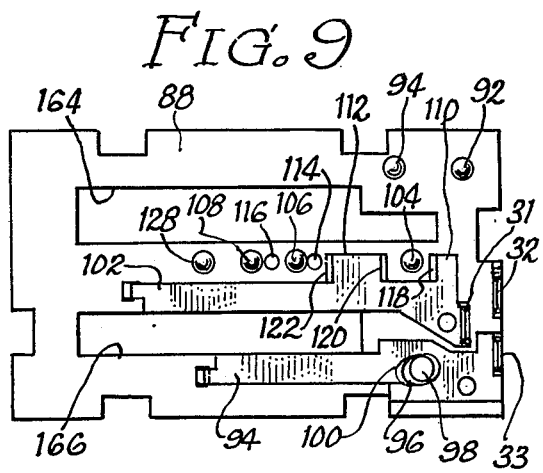
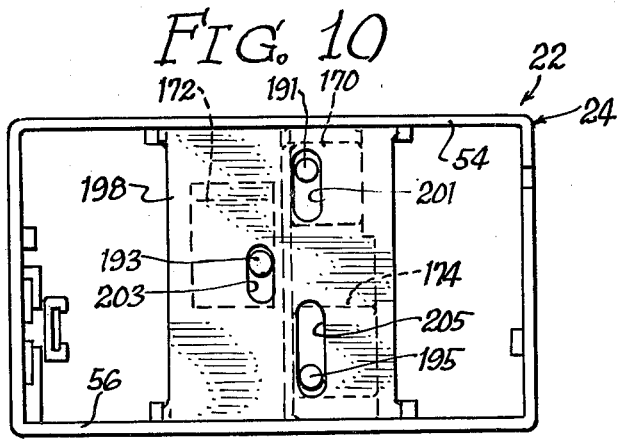
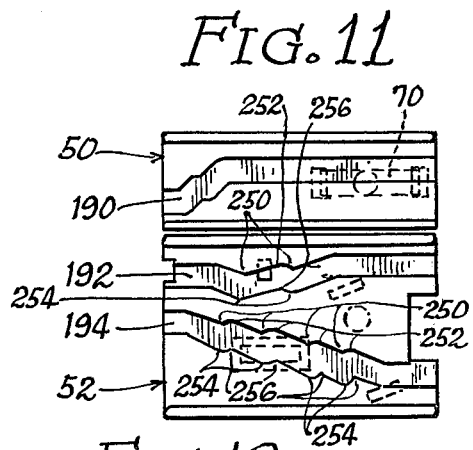
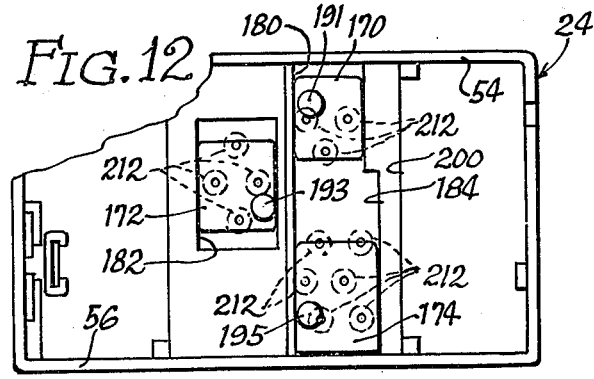
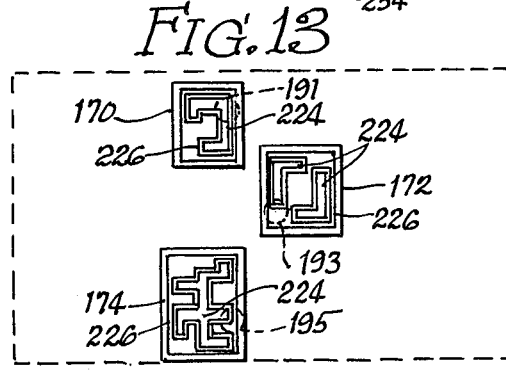

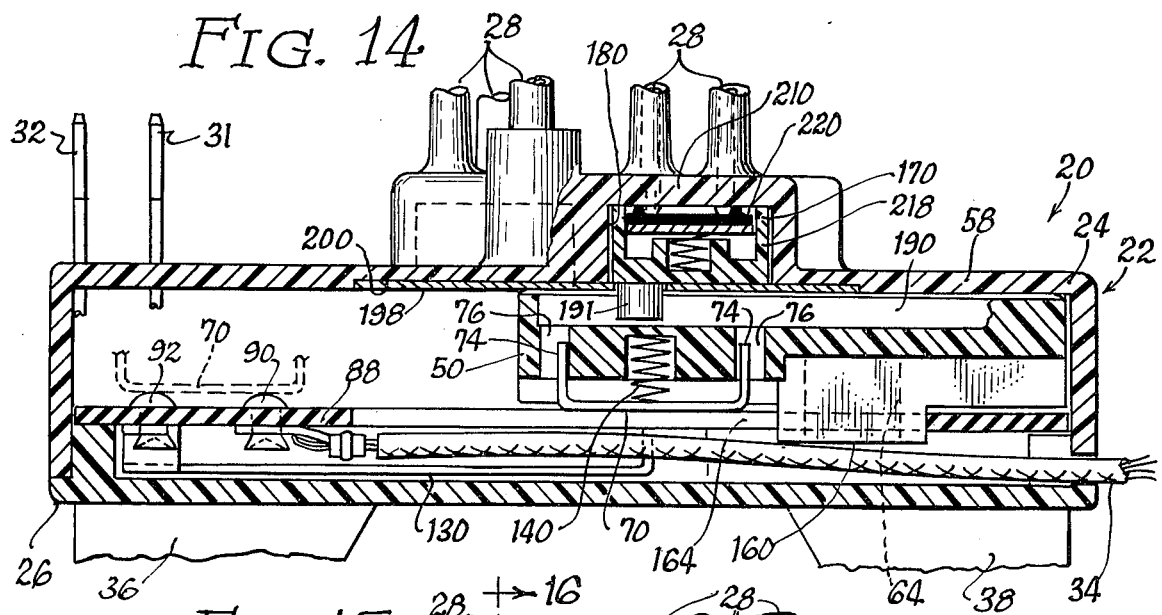
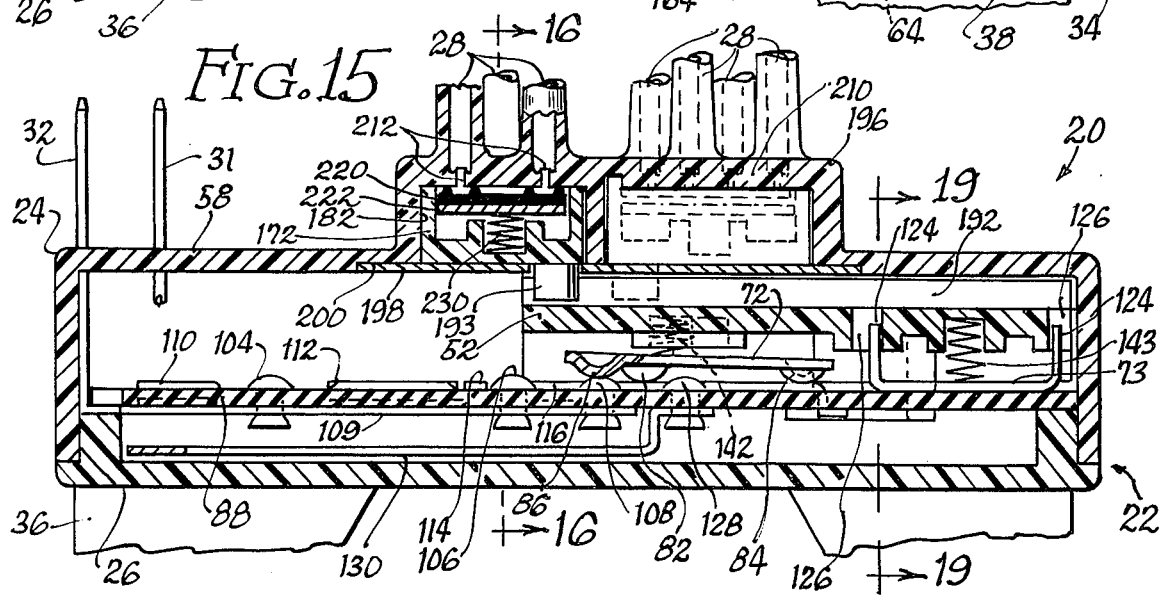
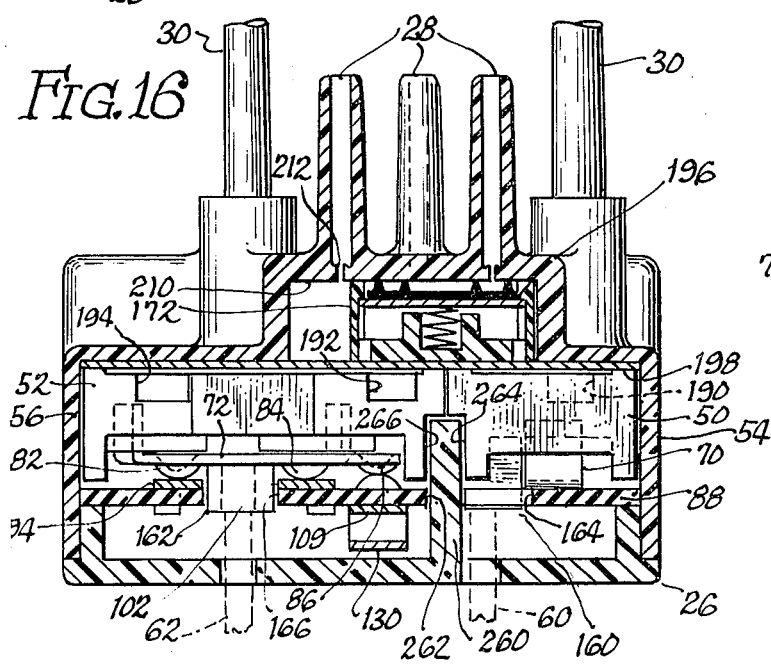
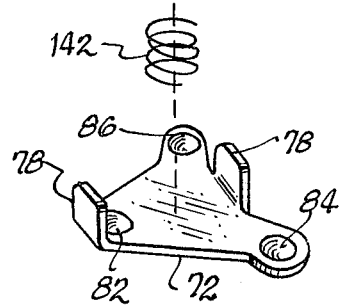
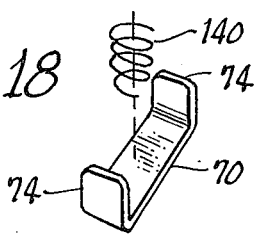

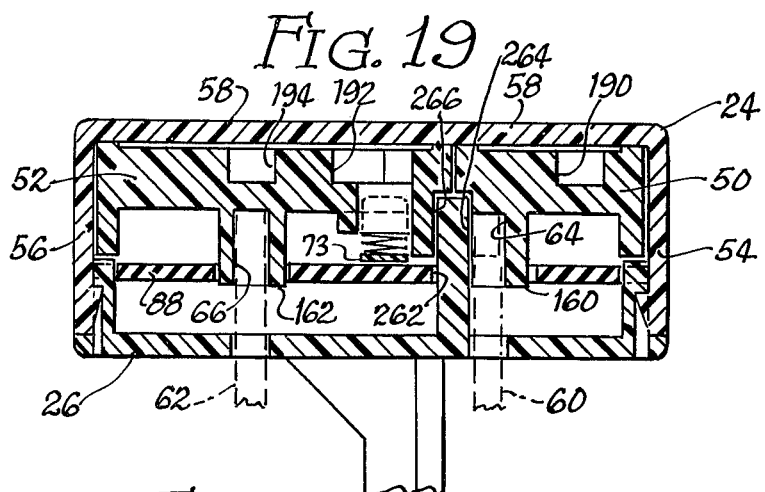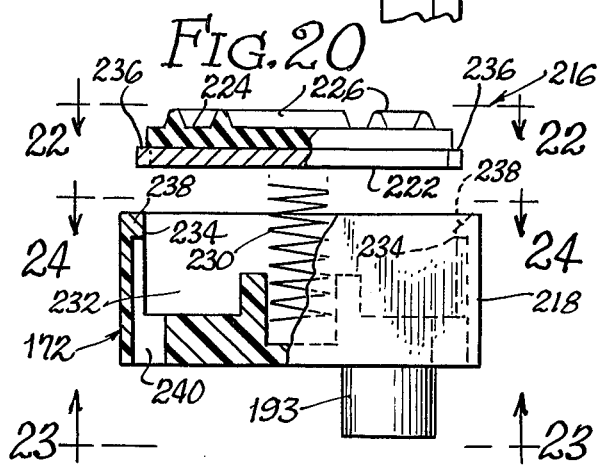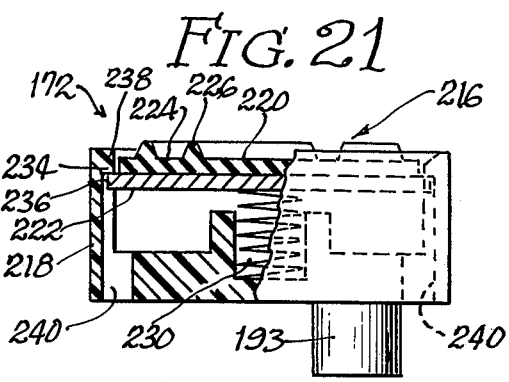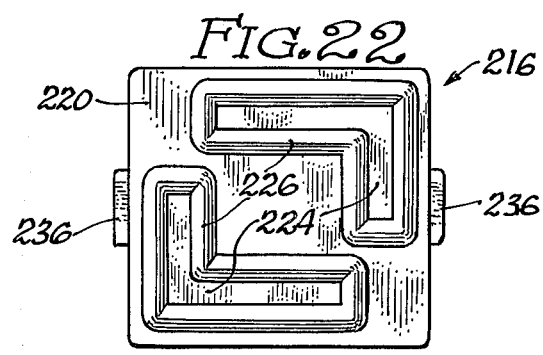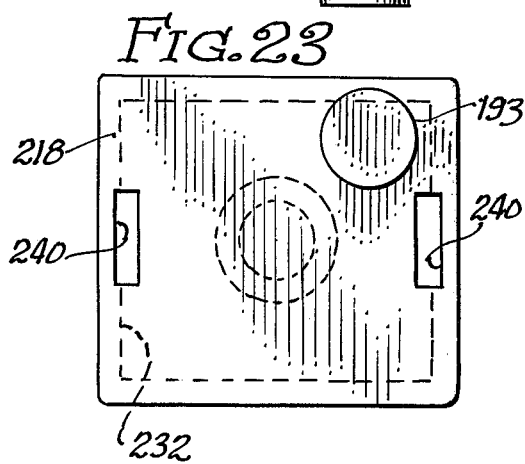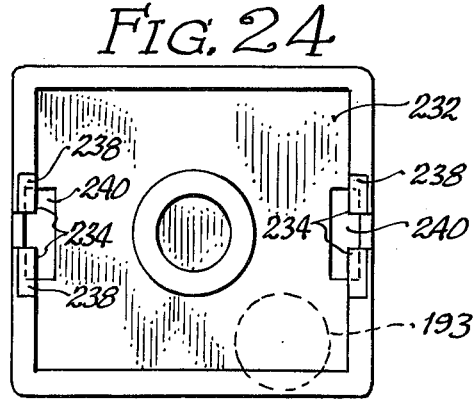

ELECTRICAL SWITCH AND FLUID CONTROL DEVICE

This invention relates to control devices for controlling both fluid power and electrical power.

The control device of the present invention will find many applications, but is particularly well adapted for controlling vacuum operated devices and electrically operated devices on an automobile or some other automotive vehicle. For example, the control device of the present invention may be employed to control the operation of a heating and air-conditioning system on an automotive vehicle. For this particular service, the control device may be employed to control one or more electrically operated motors and clutches, as well as one or more vacuum operated diaphragms, which may be employed to operate valves, dampers, shutters and the like.

One object of the present invention is to provide a highly versatile and effective control device which is capable of carrying out a complex series of control functions, involving both electrical components and fluid power operated components.

Another object of the present invention is to provide a new and improved electrical switch and fluid control device having a movable control member which is adapted to operate both electrical contact means and a valve member, in accordance with virtually any desired relationship between the movement of the control member and the movement of the valve member. In accordance with the present invention, the control device preferably comprises a casing, a control member movable in such casing along a predetermined path, electrical switching means in such casing and operable by the movement of the control member along such path, fluid control means in such casing and including a valve member movable in such casing in a direction transverse to the path of the control member, and camming means operable between such control member and such valve member for moving the valve member transversely to such path in response to movement of the control member along such path.

The camming means may comprise a cam element and a follower element. One element may be disposed on the control member, while the other element is disposed on the valve member. It is advantageous to provide the camming means in the form of a cam track on the control member and a cam follower on the valve member and engageable with the cam track. The shape of the cam track may be such as to produce virtually any desired control relationship between the movement of the control member and the transverse movement of the valve member. Thus, a highly complex series of control operations can readily be carried out.

The switching means may comprise fixed contact means in the casing and movable contact means operable by the movement of the control member. The operation of the movable contact means may readily be coordinated with the operation of the valve member.

Further objects, advantages and features of the present invention will appear from the following description, taken with the accompanying drawings, in which:

FIG. 1 is a top plan view of a combined electrical switch and fluid control device to be described as an illustrative embodiment of the present invention.

FIG. 2 is an end view of the device, taken generally as indicated by the line 2—2 in FIG. 1.

FIG. 3 is a front view of the control device, taken generally as indicated by the line 3—3 in FIG. 1.

FIG. 4 is an end view from the opposite end, taken generally as indicated by the line 4—4 is FIG. 1.

FIG. 5 is a rear view of the control device shown in FIG. 1.

FIG. 6 is a front view of the control device with the front cover removed, the view being taken generally along the line 6—6 in FIG. 1.

FIG. 7 is an inside or rear view of the front cover for the control device.

FIG. 8 is a front view of the control device with both the front cover and the terminal board removed.

FIG. 9 is an inside or rear view of the terminal board for the control device.

FIG. 10 is a front view, similar to FIG. 8, but with the control members or carriages removed.

FIG. 11 is a rear view of the control members or carriages, showing the cam tracks thereon.

FIG. 12 is a front view, similar to FIG. 10, but with the valve cover plate removed.

FIG. 13 is a rear view of the valve members for the control device.

FIGS. 14 and 15 are enlarged longitudinal sections, taken through the control device, generally along the lines 14—14 and 15—15 in FIG. 3.

FIG. 16 is a transverse section, taken generally along the line 16—16 in FIG. 15.

FIGS. 17 and 18 are perspective views showing the contactors and the contactor springs for the control device.

FIG. 19 is a fragmentary transverse section, taken generally along the line 19—19 in FIG. 15.

FIG. 20 is an enlarged partial section of one of the valve members, shown in a disassembled condition.

FIG. 21 is a view similar to FIG. 20, but showing the valve member in an assembled condition.

FIG. 22 is an enlarged rear view of the valve slider for the valve member, taken generally as indicated by the line 22—22 in FIG. 20.

FIG. 23 is a front view of the valve member, taken generally as indicated by the line 23—23 in FIG. 20.

FIG. 24 is a rear view of the valve member with the valve slider and its biasing spring removed, the view being taken generally as indicated by the line 24—24 in FIG. 20.

As just indicated, the drawings illustrate a combined electrical switch and fluid control device 20, adapted to control both electrical components, such as motors and clutches, and fluid operated devices, such as diaphragms for operating valves, dampers and shutters. The illustrated control device 20 is particularly well adapted for use on an automobile or some other automotive vehicle, to control the heating and air-conditioning system for the vehicle. In such a system, the control device 20 may be employed to control a fan motor, an electrically operated clutch to drive the air-conditioning compressor, a vacuum operated temperature valve or other device, and one or more vacuum operated function control devices.

As illustrated in FIGS. 1–5, the control device 20 has a casing 22, which in this case comprises a body 24 and a front cover 26. The control device 20 is adapted to be connected to both the vacuum powered control system and the electrical system of the vehicle. Thus, the body 24 of the casing 22 is provided with a cluster of nipples 28 for connecting the control device 20 to the vacuum powered control system. As shown in FIG. 5, there are thirteen such nipples 28 in this case. Adjacent the cluster of nipples 28, the body 24 of the casing 22 is provided with a pair of locating pins 30. The nipples 28 and the locating pins 30 are adapted to receive a suitable connector, not shown, to establish disengageable connections between the nipples 28 and a plurality of tubes or hoses, leading to various components of the vacuum powered control system.

The illustrated control device 20 is also provided with a plurality of electrical terminals for connecting the control device to the electrical control system. As shown to best advantage in FIGS. 1 and 5, three electrical terminal prongs 31, 32 and 33 project rearwardly from the casing 22. The control device 20 has an additional terminal in the form of a lead or wire 34, extending out of the casing 22.

The front cover 26 of the illustrated control device 20 is provided with integral brackets 36 and 38, having pivot openings 40 and 42 therein for receiving suitable control levers, or the like, adapted to be operated manually or otherwise, to adjust the control device 20. Slots 44 and 46 are formed in the front cover 26 to admit the ends of the control levers. The front cover 26 is suitably secured to the body 24.

The internal construction of the control device 20 is shown in FIGS. 6–23. The control device employs one or more movable control members or carriages, adapted to control the electrical switching functions and also the vacuum control functions of the control device 20. In this case, the control device 20 utilizes two control members or carriages 50 and 52, shown to best advantage in FIGS. 8, 11, 14, 15, 16 and 19. Each of the control members 50 and 52 is movable along a predetermined path in the casing 22. In this case, each of the control members 50 and 52 is slidable along a linear path.

The control members 50 and 52 are guided for linear movement between longitudinal side walls 54 and 56 of the casing 22. The illustrated control members 50 and 52 are generally rectangular and are confined side by side between the longitudinal walls 54 and 56, as will be evident from FIG. 8. The control members 50 and 52 are also guided by a longitudinal rear wall 58 on the casing 22, as will be seen from FIGS. 14 and 15.

As previously indicated, the control members 50 and 52 are adapted to be operated by control levers or other operating members, extending into the casing 22 through slots 44 and 46 in the front cover 26. Fragments of the levers are shown in phantom at 60 and 62 in FIGS. 16 and 19. It will be seen that slots or recesses 64 and 66 are formed in the front sides of the control members 50 and 52 for receiving the operating levers 60 and 62.

Each of the control members 50 and 52 is adapted to operate both electrical switching means and fluid control means. Various details of the electrical switching means are shown in FIGS. 6, 8, 9, 14, 15, 16, 17 and 18. Each of the control members 50 and 52 is adapted to operate movable contact means, engageable on a selective basis with fixed contact means. While the illustrated switching means are highly advantageous, various other switching means may be employed.

As shown in FIG. 8, the illustrated control members 50 and 52 are adapted to carry movable contactors 70, 72 and 73. As shown, the contactor 70 is in the form of a bar or strip made of copper or some other conductive material. The ends of the contactor 70 are formed with tabs or prongs 74, projecting rearwardly into guide slots 76, formed in the control member 50.

As shown in FIGS. 8 and 17, the contactor 72 is preferably in the form of a generally triangular plate made of copper or some other conductive material. Tabs or prongs 78 are bent rearwardly from the contactor 72 and are adapted to extend into guide slots 80, formed in the control member 52.

As shown, the contactor 72 is formed with three forwardly projecting contact points 82, 84 and 86, which may be spherically rounded in shape. Thus, the contactor 72 has three points of selective engagement with the corresponding fixed contact means, while the contactor 70 is adapted to have two points of selective engagement with the corresponding fixed contact means.

In the illustrated control device 20, the fixed contact means are preferably mounted within the casing 22 on a terminal board 88, shown in FIGS. 6, 9, 14, 15, 16 and 19. The terminal board 88 is made of an electrically insulating material, such as a suitable resinous plastic material.

As shown in FIG. 9, the contactor 70 is selectively engageable with fixed contact means, in the form of contact points 90 and 92, mounted on the terminal board 88 and projecting rearwardly therefrom. The contact points 90 and 92 may be spherically rounded in shape. It will be seen that the terminal lead or wire 34 is connected to the contact point 90.

The contactor 72 is engageable with a multiplicity of fixed contact elements. Thus, the illustrated contact point 82 on the contactor 72 is engageable with a contact strip or rail 94, shown in FIG. 9. The contact strip 94 is mounted on the terminal board 88 and is connected to the terminal prong 33.

In the illustrated switch construction, the contact point 82 on the contactor 72 is movable out of engagement with the contact strip 94 at one point along the path of the control member 52. In this case, such point of disengagement occurs at one end of the range of movement of the control member 52. To provide for such disengagement, an opening or break 96 is formed in the conductive strip 94 near its right-hand end, as shown in FIG. 9. When the control member 52 is moved to the left from its position shown in FIG. 8, the contact point 82 eventually moves opposite the opening 96 at the left-hand end of the range of movement of the control member 52. It is prefered to provide a dummy contact or boss 98 within the opening 96, for engagement by the contact point 82, to hold it out of engagement with the conductive strip 94. In this case, the boss 98 takes the form of a rivet mounted on the insulating terminal board 88 and left without any connection to the electrical circuit. The boss 98 may be made of either insulating or conductive material.

A ramp or chamfer 100 is preferably formed on the cinductive strip 94 at one end of the opening 96, to facilitate the smooth sliding movement of the contact point 82 between the boss 98 and the conductive strip 94.

The contact point 84 on the contactor 72 is engageable with another contact strip or rail 102, mounted on the insulating terminal board 88 and made of copper or some other conductive material. As shown, the contact strip 102 is connected to the terminal prong 31.

The contact point 86 on the contactor 72 is selectively engageable with a row of contact points 104, 106, and 108, mounted on the terminal board 88. In this case, the terminal prong 32 is connected to the contact points 104, 106 and 108 by means of a conductive strip 109, as shown in FIG. 15. The conductive strip 109 is on the opposite side of the terminal board 88 from the contactor 72 and thus is not engageable by the contact point 86.

The contact point 86 is also engageable with a series of dummy contact members which facilitate the movement of the contact point 86 but do not establish any electrical circuit. These dummy contact members are designated 110, 112, 114 and 116 in FIG. 9. It will be seen that the dummy contact members 110 and 112 are in the form of tabs on the conductive strip 102. The tabs 110 and 112 are on opposite sides of the contact point 104. Ramps 118 and 120 are preferably formed on the edges of the tabs 110 and 112, adjacent the contact point 104, to facilitate the sliding movement of the contact point 86.

The dummy contact members 114 and 116 are illustrated as insulating semiperforations, formed upwardly from the insulating board 88. The dummy contact members 110 and 112 may also be made of insulating material, if desired. Although the illustrated dummy contact members 110 and 112 are in the form of conn-ductive tabs on the conductive strip 104, no electrical circuit is closed when the contact point 86 engages the tabs 110 and 112, because the contact point 84 on the contactor 72 engages the contact strip 102 at all times.

As shown, the semiperforation 114 is disposed between the contact point 106 and the tab 112, while the semiperforation 116 is disposed between the contact points 106 and 108. A ramp 122 is preferably formed on the edge of the tab 112 adjacent the semiperforation 114 to facilitate the smooth sliding movement of the contact point 86.

The second contactor 73 on the control member 52 is similar to the contactor 70, and thus is in the form of a flat bar or strip, having tabs or prongs 124 bent rearwardly therefrom, and slidably guided in slots or openings 126 (FIG. 15), formed in the control member 52, which is preferably made of an insulating material, such as a suitable resinous plastic material.

The contactor 73 is movable longitudinally along a path which is generally aligned with the path of the contact point 86 on the contactor 72. In this case, an additional contact point 128 is provided for engagement by the contactor 73, which is also engageable with the contact points 108 and 106. In this case, the contact point 128 is connected to the contact point 92, by means of a conductive bar or strip 130, shown in FIGS. 6, 14 and 15.

The contactors 70, 72 and 73 are preferably provided with resilient means for biasing the contactors against the various fixed contact means on the terminal board 88. In this case, a biasing spring 140 is provided between the control member 50 and the contactor 70, as shown in FIG. 14. A biasing spring 142 is provided between the control member 52 and the contactor 72, as shown in FIGS. 15 and 17. Similarly, a biasing spring 143 is provided between the control members 52 and the contactor 73.

As shown in FIGS. 6 and 16, the control members 50 and 52 are formed with forwardly projecting bosses or lugs 160 and 162, adapted to be received in slots 164 and 166, formed in the insulating terminal board 88. The lugs 160 and 162 are slidable along the slots 164 and 166. It will be seen that the openings or slots 64 and 66 for the control levers 60 and 62 are formed in the lugs 160 and 162.

In addition to operating the switching means, the movable control members 50 and 52 are adapted to operate fluid control means, adapted to establish connections on a selective basis between various fluid carrying lines, connected to the nipples 28. In this particular case, the control device 20 is especially well adapted for controlling the operation of vacuum powered diaphragms or other devices, used in connection with the heating and air-conditioning system for an automotive vehicle.

The illustrated control device 20 utilizes one or more valve members which are movable transversely to the paths of the control members 50 and 52. The valve members are adapted to be operated by camming means, interposed between each valve member and the corresponding control member.

This construction provides an extremely versatile and flexible control system. By changing the configuration of the camming means, it is possible to achieve virtually any desired relationship between the transverse movement of the valve members and the longitudinal movement of the control members.

In this case, the control member 50 operates one valve member 170, while the control member 52 operates two additional valve members 172 and 174. As shown in FIG. 12, the valve member 170 is slidable in a tranverse slot or recess 180, formed in the casing 22. Similarly, the valve member 172 is slidable in another transverse slot or recess 182, formed in the casing 22, while the valve member 174 is slidable in a transverse slot or recess 184. In this case, the guide slot 180 opens into the guide slot 184 but is narrower than the slot 184. The number of valve members and their arrangement in the casing are subject to variation, depending upon the desired control functions to be performed by the control device 20.

The camming means for the valve member 170 may take the form of a cam track 190 in the control member 50, as shown in FIG. 11. A cam follower is provided on the valve member 170, in the form of a forwardly projecting pin or lug 191. As shown in FIG. 11, the cam track 190 takes the form of a cam slot formed in the rear side of the control member 50. The cam track 190 extends in a generally longitudinal direction, but deviates laterally or has a transverse throw in accordance with the transverse movement to be imparted to the valve member 170 when the control member 50 is moved along its longitudinal path.

Similarly, the camming means for the valve member 172 may take the form of a cam track 192 on the control member 52, such track 192 having a transverse throw for moving the valve member 172. The cam track 192 is preferably in the form of a groove in the rear side of the control member 52. The valve member 172 includes a cam follower, preferably in the form of a pin or lug 193, adapted to be received in the cam track 192.

The camming means for the valve member 174 preferably takes the form of a cam groove or other track 194, formed in the rear side of the control member 52, and adapted to receive a cam follower 195, such as the illustrated pin or lug projecting forwardly from the valve member 174. The cam track 194 has a transverse throw for imparting transverse movement to the follower 195. It will be understood that the shape of the cam tracks 192 and 194 is subject to variation, depending upon the particular control functions which are to be carried out by the valve means.

It will be seen from FIGS. 14, 15 and 16 that the guide slots 180, 182 and 184 for the valve members 170, 172 and 174 are formed in a rearwardly projecting portion 196 on the body 24 of the casing 22. The nipples 28 are formed on the rearwardly projecting portion 196.

As shown in FIG. 10, the valve members 170, 172 and 174 are retained in the guide slots 180, 182 and 184 by a valve cover plate 198, mounted in a recess 200. The body 24 of the casing 22 has a rear guide wall 58 in which the recess 200 is formed, so that the cover plate 198 will be flush with the wall 58. Thus, the control members 50 and 52 are freely slidable along the wall 58 and the cover plate 198.

It will be seen from FIG. 10 that the cam follower elements 191, 193 and 195 project forwardly through transverse slots 201, 203 and 205 in the valve cover plate 198.

As shown in FIGS. 14–16, the rearwardly projecting portion 196 of the casing 22 has a rear wall 210 along which the valve members 170, 172 and 174 are slidable. The hollow nipples 28 connect with a multiplicity of valve ports 212 extending through the rear wall 210. The exact number and arrangement of the valve ports 212 depends upon the control functions to be performed by the valve members 170, 172 and 174. As shown in FIG. 12, three of the valve ports 212 are opposite the valve member 170. Four of the valve ports 212 are opposite the valve member 172. Six of the valve ports 212 are opposite the valve member 174.

The valve members 170, 172 and 174 provide passage means for selectively interconnecting the valve ports 212 so as to control the operation of the vacuum operated components connected thereto. The detailed construction of the valve members is subject to variation, depending upon the control functions which are desired.

By way of example, FIGS. 20–24 illustrate details of the valve member 172, which in this case comprises a valve slider 216 mounted on a carriage 218. The valve slider 216 may comprise a sealing member 220 mounted on a backing plate or member 222. The sealing member or element 220 is preferably made of silicone rubber or some other suitable soft resilient material. The backing plate 222 is preferably made of metal or some other relatively rigid material. The sealing member 220 is bonded or cemented to the backing plate 222.

One or more passages are formed in the sealing member 220 to afford selective communication between the valve ports 212. As shown in FIG. 22, this particular sealing member 220 is formed with two separate channels or grooves 224, bounded by ridges 226 projecting rearwardly on the sealing member 220. It will be seen from FIGS. 15 and 16 that the ridges 226 are slidable along the rear wall 210, in which the valve ports 212 are formed.

The exact configuration of the valve passages 224 and the ridges 226 is subject to variation, depending upon the desired functions which are to be carried out by the valve members 170, 172 and 174. FIG. 13 shows the configuration of the passages 224 and the ridges 226 which are formed on all three valve members 170, 172 and 174. The corresponding layout of the valve ports 212 is shown in FIG. 12.

Each valve member is preferably provided with means for biasing the valve slider 216 rearwardly into sealing engagement with the rear wall 210 in which the valve ports 212 are formed. As shown in FIGS. 20 and 21, a biasing spring 230 is provided between the carriage 218 and the backing plate component 222 of the slider 216. The spring 230 presses the slider 216 against the surface 210, while pressing the carriage 218 against the valve retaining plate 198.

The valve slider 216 is movably received in an opening or cavity 232 formed in the carriage 218. To facilitate the assembly of the control device 20, each of the valve members 170, 172 and 174 is preferably provided with means for retaining the valve slider 216 in the cavity 232. As shown in FIGS. 20–24, such means may comprise inwardly projecting lips or barbs 234 on the carriage 218. Such lips 234 are adapted to engage and retain tabs 236 which project laterally from the valve backing plate 222.

The carriage 218 is preferably made of a sufficiently flexible material to enable the tabs 236 to be pushed past the lips 234. Thus, the carriage 218 may be made of a suitable resinous plastic material. Ramps 238 may be formed on the lips 234 to facilitate the movement of the tabs 236 past the lips 234.

The illustrated carriage 218 is formed with vent passages 240 connecting with the cavity 232, so that the valve slider 216 will be freely movable in the cavity. The vent passages 240 prevent any pressure or vacuum from developing in the cavity. It will be understood that the details of the valve members 170 and 174 may be essentially the same as the details of the valve member 172, as illustrated in FIGS. 20–24.

It is highly advantageous to provide the camming means for moving the valve members transversely, in response to longitudinal movement of the control members. With this arrangement, it is possible to operate any of the valve members at any desired point along the range of movement of the corresponding control member. This can be accomplished by varying the shape of the cam which operates the particular valve member.

By virtue of the camming means, the operation of each of the valve members is positive in both directions. Each valve member may have a different range of movement, if desired. Moreover, the range of movement of the control member is not restricted in any way by the range of movement of any of the valve members. Several valve members may be provided. Each valve member may be operated independently in accordance with an individualized program, differing from the programs for the other valve members.

It is also highly advantageous to utilize the illustrated switching means, because sliding contact elements are used exclusively, so that the contact elements are self-cleaning. Each of the movable contactors has either two or three points of engagement with the fixed contact elements, so that the contact pressure developed by the biasing springs is distributed with a high degree of uniformity. Each of the various switching operations can be carried out at any desired point along the range of movement of the corresponding control member, by varying the shape and the arrangement of the contactors and the fixed contact elements.

Thus, the electrical switching operations and the fluid power controlling operations can readily be coordinated, as desired. For this reason, the control device of the present invention is extremely advantageous for use in connection with the heating and air-conditioning system of an automotive vehicle, or for other situations involving a complex sequence of control functions.

FIG. 11 illustrates additional advantageous features of the cam tracks 190, 192 and 194 in the operating members or carriages 50 and 52. It will be recalled that the cam tracks 190, 192 and 194 are in the form of grooves in the rear sides of the carriages 50 and 52.

It will be particularly evident from FIG. 11 that the sides of the cam track or groove 194 are somewhat saw-toothed or barbed. Thus, one side of the groove 194 comprises a series of transverse projections, points or barbs 250, alternating with rounded hollows or notches 252. The points 250 are also preferably rounded but with a considerably smaller radius than that of the rounded hollows 252. The transverse projections or points 250 deviate transversely from the transverse throw of the cam track 194. Similarly, the other side of the cam groove 194 is formed with a series of rounded hollows or notches 254, alternating with transverse projections or points 256.

It will be seen that the points 250 and hollows 252 on one side of the cam track 194 are staggered relative to the points 256 and the hollows 254 on the opposite side of the cam track. Thus, the points 250 on one side of the cam track 194 are opposite the hollows 254 on the opposite side. Similarly, the hollows 252 on one side of the cam track 194 are opposite the points 256 on the opposite side.

The provision of the staggered points and hollows 250, 252, 254 and 256 imparts a saw-toothed shape to each side wall of the cam track 194, while causing the cam track to zigzag to a small but appreciable extent. This zigzagging of the cam track 194 produces overtravel of the corresponding cam follower 195, so as to compensate for lost motion or play in the operating mechanism for the valve member 174.

The operation of the saw-toothed or zigzag cam track may perhaps be understood more clearly by assuming that the accurate operating positions of the valve member 174 are determined by the location of the points on one side of the cam track. For example, the location of the points 250 may be assumed to control the accurate lateral positioning of the valve member 174. When the carriage 52 is moved in either direction, to the left or to the right as viewed in FIG. 11, the points 250 push the cam follower 195 downwardly, as viewed in FIG. 10, to the desired operating positions. When the carriage 52 is between its operating positions, the points 256 on the opposite side of the cam track 194 push the cam follower 195 upwardly, to a small but appreciable extent, to insure that the cam follower 195 will be engaged by the next point 250 in the sequence.

Thus, the operating positions of the valve member 174 are accurately established by the lateral positions of the points along the wall of the cam track, and not by the lateral positions of the hollows which are opposite such points. In this way, any lost motion is always taken up, so that it does not cause inaccuracy in the positioning of the valve member 174.

Similar points and hollows are provided along the walls of the cam track 192. Thus, one wall of the cam track 192 is formed with two of the points 250 and one of the hollows 252. The other side of the cam track 192 is formed with two of the hollows 254, opposite the points 250, and one of the points 256, opposite the hollow 252.

As shown in FIGS. 16 and 19, the cover 26 on the casing 22 is preferably provided with a fin or flange 260 which extends between the operating members or carriages 50 and 52. The flange 260 extends through a slot 262 in the terminal board 88. Channels 264 and 266 are formed in the operating members 50 and 52 to receive the flange 260. The flange 260 assists in guiding the longitudinal movement of the operating members 50 and 52.

We claim:
1. A fluid control device,
comprising a casing,
a control member movable in said casing in opposite directions along a predetermined path,
fluid control means in said casing and having a valve member movable in said casing in opposite directions transverse to said path of said control member,
and camming means operable between said control member and said valve member for moving said valve member transversely to said path in response to movement of said control member along said path,
said camming means including a cam track and a follower for engaging and following said track,
said cam track having a transverse throw relative to said path,
said cam track having two opposite sides,
said follower having elements for engaging and following both sides of said cam track,
at least one side of said cam track having at least one transverse projection deviating from the transverse throw of said cam track,
the other side of said cam track having a hollow formation opposite said transverse projection,
whereby said transverse projection accurately determines the corresponding operating position of said follower for both directions of movement of said control member so as to avoid inaccuracies due to play between said follower and said cam track.

2. A device according to claim 1,
in which said cam track has a plurality of such transverse projections on at least one side of said cam track,
said cam track having such hollow formations opposite such transverse projections,
each hollow formation being on the opposite side of said cam track from the corresponding transverse projection,
whereby said transverse projections accurately determine the corresponding operating positions of said follower for both directions of movement of said control member.

3. A device according to claim 1,
in which said cam track has a plurality of such transverse projections which are staggered on opposite sides of said cam track,
said cam track having a plurality of such hollow formations opposite the corresponding transverse projections,
each hollow formation being on the opposite side of said cam track from the corresponding transverse projection,
whereby said transverse projections accurately determine the corresponding operating positions of said follower for both directions of movement of said control member.

4. A device according to claim 1, in which said cam track takes the form of a cam groove in said control member, said follower being in the form of a follower member projecting from said valve member into said cam groove.

5. A control device, comprising a casing, an operating member movable in said casing in opposite directions along a predetermined path, an operated member movable in said casing in a direction transverse to said path.

and camming means operable between said operating member and said operated member for moving said operated member transversely to said path in response to movement of said operating member along said path, said camming means including a cam track and a follower for engaging and following said cam track, said cam track having a transverse throw relative to said path, said cam track having two opposite sides, said follower having elements for engaging and following both sides of said cam track, at least one side of said cam track having at least one transverse projection deviating from the transverse throw of said cam track, the other side of said cam track having a hollow formation opposite said transverse projection, whereby said transverse projection accurately determines the corresponding position of said follower for both directions of movement of said operating member so as to avoid inaccuracies due to play between said follower and said cam track.

6. A device according to claim 5, in which said cam track has a plurality of such transverse projections on at least one side of said cam track, said cam track having a plurality of such hollow formations opposite the corresponding transverse projections, each hollow formation being on the opposite side of said cam track from the corresponding transverse projection, whereby said transverse projections accurately determine the positions of said follower for both directions of movement of said operating member.

7. A device according to claim 5, in which said cam track has a plurality of such transverse projections staggered on opposite sides of said cam track, said cam track having a plurality of such hollow formations opposite the corresponding transverse projections, each hollow formation being on the opposite side of said cam track from the corresponding transverse projection, whereby said transverse projections accurately determine the positions of said follower for both directions of movement of said operating member.

8. A device according to claim 5, in which said cam track takes the form of a cam groove in said operating member, said follower being in the form of a follower member projecting from said operated member into said cam groove.

9. A fluid control device, comprising a casing, first linear guide means in said casing, a control member movable in said casing in opposite directions along said first linear guide means, second linear guide means in said casing extending transversely to said first linear guide means, a valve member movable in said casing in opposite directions along said second linear guide means, valve port means in said casing for cooperating with said valve member, a cam track on said control member and having a transverse throw relative to said first guide means, said cam track having two opposite sides, and a follower on said valve member and having elements for engaging and following both sides of said cam track, whereby movement of said control member in both directions along said first guide means positively produces movement of said valve member in both directions along said second guide means.

10. A device according to claim 9, including additional guide means in said casing extending transversely to said first guide means, an additional valve member movable along said additional guide means, additional valve port means in said casing for cooperating with said additional valve member, an additional cam track on said control member, said additional cam track having two opposite sides, and an additional follower on said additional valve member and having elements for engaging and following both sides of said additional cam track, whereby both valve members are positively operated in both directions by movement of said control member in both directions.

11. A device according to claim 10, in which both cam tracks take the form of cam grooves in said control member, said followers being in the form of follower members projecting from said valve members into the respective grooves.

12. A device according to claim 9, in which said cam track takes the form of a cam groove in said control member, said follower being in the form of a follower member projecting from said valve member into said cam groove.

* * * * *